(12) United States Patent
Tomiyama et al.

(10) Patent No.: US 7,457,465 B2
(45) Date of Patent: Nov. 25, 2008

(54) METHOD, APPARATUS, AND COMPUTER-READABLE MEDIUM FOR PROCESSING AN IMAGE WHILE EXCLUDING A PORTION OF THE IMAGE

(75) Inventors: Tadao Tomiyama, Nagano (JP); Toshie Imai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 758 days.

(21) Appl. No.: 10/825,892

(22) Filed: Apr. 16, 2004

(65) Prior Publication Data

US 2004/0264801 A1     Dec. 30, 2004

(30) Foreign Application Priority Data

Apr. 18, 2003    (JP)    ............... 2003-114423

(51) Int. Cl.
*G06K 9/00*    (2006.01)
*G03F 3/08*    (2006.01)
(52) U.S. Cl. ...................... 382/181; 358/521
(58) Field of Classification Search ................ 382/163, 382/164, 282, 135–139, 181–231; 358/500–540
See application file for complete search history.

(56) References Cited

U.S. PATENT DOCUMENTS

| | | | | |
|---|---|---|---|---|
| 2,894,247 A | * | 7/1959 | Relis | 382/201 |
| 4,251,799 A | * | 2/1981 | Jih | 382/174 |
| 4,736,443 A | * | 4/1988 | Miyagawa et al. | 382/282 |
| 4,845,764 A | * | 7/1989 | Ueda et al. | 382/146 |
| 4,926,492 A | * | 5/1990 | Tanaka et al. | 382/168 |
| 5,081,685 A | * | 1/1992 | Jones et al. | 382/105 |
| 5,083,201 A | * | 1/1992 | Ohba | 348/155 |
| 5,313,526 A | * | 5/1994 | Cheong | 382/176 |
| 5,361,147 A | * | 11/1994 | Katayama et al. | 358/532 |
| 5,369,715 A | * | 11/1994 | Tanaka et al. | 382/170 |
| 5,444,537 A | * | 8/1995 | Yoshimura et al. | 356/603 |
| 5,471,535 A | * | 11/1995 | Ikezawa et al. | 382/199 |

(Continued)

FOREIGN PATENT DOCUMENTS

JP        08-062741     *    8/1996

(Continued)

OTHER PUBLICATIONS

Ikonomakis, N., K.N. Plataniotis, and A.N. Venetsanopoulos. "Color Image Segmentation for Multimedia Applications". Journal of Intelligent amd Robic Systems. vol. 28. pp. 5-20. 2000.*

(Continued)

*Primary Examiner*—Bhavesh Mehta
*Assistant Examiner*—Manav Seth
(74) *Attorney, Agent, or Firm*—Martine Penilla & Gencarella, LLP (57) ABSTRACT

Image data by which an image is represented with a plurality of pixels is acquired. A portion of the image data characterizing an artificial image is extracted from the image represented by the acquired image data in an artificial-image extracting procedure. The prescribed image processing is performed by excluding the image data of the portion extracted from the acquired image data in the artificial-image extracting procedure. In this manner, the image processing can be performed without being affected by the artificial image.

9 Claims, 7 Drawing Sheets

U.S. PATENT DOCUMENTS

| | | | | |
|---|---|---|---|---|
| 5,565,918 | A * | 10/1996 | Homma et al. | 348/364 |
| 5,568,571 | A * | 10/1996 | Willis et al. | 382/254 |
| 5,579,406 | A * | 11/1996 | Morikawa | 382/200 |
| 5,587,772 | A * | 12/1996 | Arai et al. | 399/32 |
| 5,668,646 | A * | 9/1997 | Katayama et al. | 358/530 |
| 5,854,853 | A * | 12/1998 | Wang | 382/176 |
| 5,909,505 | A * | 6/1999 | Katayama et al. | 382/164 |
| 5,926,564 | A * | 7/1999 | Kimura | 382/170 |
| 5,940,530 | A * | 8/1999 | Fukushima et al. | 382/164 |
| 6,067,377 | A * | 5/2000 | Hata | 382/167 |
| 6,097,834 | A * | 8/2000 | Krouse et al. | 382/137 |
| 6,351,558 | B1 * | 2/2002 | Kuwata | 382/168 |
| 6,473,517 | B1 * | 10/2002 | Tyan et al. | 382/105 |
| 6,611,632 | B1 * | 8/2003 | Tomiyama et al. | 382/300 |
| 6,621,927 | B1 * | 9/2003 | Mori et al. | 382/173 |
| 6,694,051 | B1 | 2/2004 | Yamazoe et al. | |
| 6,795,212 | B1 * | 9/2004 | Ichikawa | 358/1.9 |
| 6,937,762 | B2 * | 8/2005 | Fujiwara | 382/182 |
| 6,956,569 | B1 * | 10/2005 | Roy et al. | 345/426 |
| 7,027,508 | B2 * | 4/2006 | Shibata et al. | 375/240.08 |
| 2003/0085894 | A1 * | 5/2003 | Tatsumi | 345/426 |

FOREIGN PATENT DOCUMENTS

| | | | |
|---|---|---|---|
| JP | 10-215382 | | 8/1998 |
| JP | 2000-036043 | | 2/2000 |
| JP | 2000-134467 | | 5/2000 |
| JP | 2000148909 A | * | 5/2000 |
| JP | 2000-004393 | * | 7/2000 |
| JP | 2000-222564 | | 8/2000 |
| JP | 2001-144962 | | 5/2001 |
| JP | 2001-358954 | | 12/2001 |

OTHER PUBLICATIONS

Abstract of Japanese Patent Publication No. 2000-036043, Pub. Date: Feb. 2, 2000, Patent Abstracts of Japan.

Abstract of Japanese Patent Publication No. 10-215382, Publication Date: Aug. 11, 1998, Patent Abstracts of Japan.

Abstract of Japanese Patent Publication No. 2000-134467, Publication Date: May 12, 2000, Patent Abstracts of Japan.

Abstract of Japanese Patent Publication No. 2000-222564, Publication Date: Aug. 12, 2000, Patent Abstracts of Japan.

Abstract of Japanese Patent Publication No. 2001-144962, Publication Date: May 25, 2001, Patent Abstracts of Japan.

Abstract of Japanese Patent Publication No. 2001-358954, Publication Date: Dec. 26, 2001, Patent Abstracts of Japan.

* cited by examiner

METHOD, APPARATUS, AND COMPUTER-READABLE MEDIUM FOR PROCESSING AN IMAGE WHILE EXCLUDING A PORTION OF THE IMAGE

BACKGROUND OF THE INVENTION

1. Field of the Invention

The present invention relates to an image-processing method, an image-processing apparatus, and an image-processing program product.

2. Description of the Related Art

With the recent improvement of performance of ink jet printers and digital cameras, it has become possible for us to print images in the same quality as silver-film photographs. The subjects of printing here are digital images, which can easily be retouched; accordingly, we usually retouch images for higher quality by using photo retouch software, printer drivers, etc. As such retouch requires proficiency of a certain degree, various kinds of automatic retouching have been realized. For example, the quantities of characteristics are extracted from an image, the tendencies of gradation of the image are grasped by analyzing the quantities of characteristics, and the data of the image are revised to change the tendencies of gradation (See, for example, Japanese Unexamined Patent Publication No. 2000-36043).

The above prior art has the following problem. If an artificial image is added to a natural image, the prior art grasps the tendencies of gradation of the natural image wrongly and processes the natural image inappropriately.

An artificial image of a letter, line, pattern, or the like is often composed by collecting a plurality of pixels of a single color. Accordingly, if the prior art grasps the tendencies of gradation (for example, the histogram of brightness) of a natural image containing such an artificial image, tendencies of gradation different from those of the natural image are grasped because of the high frequency of appearance of a certain value of brightness and so on. Accordingly, the prior art makes inappropriate processing or processing of an inappropriate degree (the degree of revision, etc.) to the natural image.

SUMMARY OF THE INVENTION

In accordance with the above, it is the object of the present invention to provide an image-processing method, an image-processing apparatus, and an image-processing program product capable of processing natural images containing artificial images appropriately.

To achieve the object, such a portion or portions of an artificial image or images contained in a natural image as characterize the artificial image or images are extracted from the natural image and the whole image excluding the portion or portions are processed according to the present invention. Accordingly, when the natural image is analyzed, the characteristic portion or portions of the artificial image or images do not affect the analysis and, hence, the natural image can be processed appropriately. For example, the tendencies of gradation of the natural image are grasped appropriately and the natural image is processed appropriately in accordance with the tendencies of gradation.

A means of extracting artificial images will serve the purpose if it is capable of extracting an artificial image or images, which are contained in a natural image, from the natural image; accordingly, the means can be of various types of construction. Because the image data of an artificial image reveal certain characteristics, the portion or portions characterizing the artificial image can be identified by extracting characteristic data from the image data of the artificial image.

To extract image data characteristic of an artificial image, various characteristics can be used. For example, the color of each pixel may be used. In this case, a portion consisting of a plurality of successive pixels of a certain prescribed color is extracted and the portion is regarded as an artificial image. If one is to add an artificial image of letters, lines, patterns, etc. to a natural image, one prepares the artificial image with application software which can be run on a computer and overlays the artificial image on the natural image.

Numerous colors (for example, about 16,700,000 colors) can be expressed in an image being processed by a computer, whereas the colors of letters, etc. to be prepared by application software are usually only a limited part of the numerous colors. Accordingly, colors to be used by many kinds of application software are designated as specific colors in advance. Most artificial letters consist of a plurality of successive pixels. On the other hand, it is very rare for a plurality of successive pixels of the same color to appear in a natural image even if any part may appears to human eyes to be in a single color.

Accordingly, artificial letters, etc. can easily be extracted by finding a plurality of successive pixels of one of the above specific colors. The colors often used by the above application software are, for example, those colors which are formed by combining common specific values with color component values. For example, there are many application programs which allow users to choose, as the colors of letters, colors expressed by the combinations of RGB color component values and the specific values of 0, 64, 128, 192, and 255 in a computer which expresses about 16,700,000 colors by combining RGB color component values and gradients of 0 to 256. Therefore, the colors (R, B, G)=(0, 0, 0), (0, 0, 64), . . . , (255, 255, 255) expressed by the combinations of RGB color components and the specific values of 0, 64, 128, 192, and 255 can be designated as specific colors.

It is preferable to determine whether the color of a pixel is one of the specific colors or not by determining whether the color component values of the pixel are exactly equal to the color component values of the specific color, because this method allows the pixels of specific colors to be extracted by simple processing. It is preferable in some cases, however, to regard the color of a pixel as one of the specific colors, allowing a margin of error of 1 or 2. For example, expansion into the basic function is made by Fourier transformation in the compression of an image by JPEG; accordingly, two pixels with the same color component values before compression may have different color component values after compression. In this case, it is preferable to allow a margin of error. A margin of error may be allowed only when images are compressed by JPEG. The margin of error may be changed in accordance with the compression ratios of images.

Various numbers of successive pixels of the same specific color can be adopted. On the other hand, it is rare for an image constituting a letter or the like to consist of two or three pixels in an image which consists of a plurality of pixels (for example, pixels in the form of a dot matrix); therefore, it serves the purpose if successive pixels of the same specific color equivalent in size to a letter or line can be extracted. As the whole size, or the number of pixels and resolution, of an image change, the number of pixels equivalent in size to a letter or line changes; therefore, the minimum number of successive pixels of the same color to be extracted may be changed in accordance with the numbers of pixels and resolutions of images. Besides, not only successions in the horizontal or vertical direction but also successions in both the horizontal and vertical directions may be extracted.

To extract image data characteristic of an artificial image, a plurality of successive pixels of the same color in the artificial image may be extracted. Most artificial letters, lines, patterns, etc. are in a single color. On the other hand, it is rare for a plurality of successive pixels of the same color to appear in a natural image on a display capable of expressing 16,700,000 colors or so even if any pixels may appear to human eyes to be in the same color. Therefore, letters, lines, patterns, etc. can easily be extracted by extracting a plurality of successive pixels of the same color.

If we define two pixels of the same color as two pixels with the same color component values, it is preferable because such pixels can be extracted by simple processing. In some cases, however, it is preferable to regard two pixels as of the same color, allowing a margin of error of 1 or 2 of color component values. This is true of JPEG-compressed images mentioned earlier. Such a margin of error may be allowed for only JPEG-compressed images or changed in accordance with the compression ratios of images.

To extract image data characteristic of an artificial image, a scheme may be adopted that it is determined whether the tops or bottoms of the masses are aligned horizontally or not or whether the right or left edges of the masses are aligned vertically or not if there is a plurality of masses, each of which consists of pixels of a specific color, in a natural image. In this case, the above means for extracting artificial images finds a plurality of masses, each mass consisting of a plurality of pixels of the same specific color, and extracts the masses as artificial images if their edges are aligned horizontally or vertically.

For example, the pixels at the top, bottom, right, and/or left edges of artificial letters are aligned horizontally and/or vertically. On the other hand, a natural image may contain a photograph of a signboard containing letters and, even in this case, it is rare for the edges of the letters to align horizontally and/or vertically. Accordingly, an artificial image with edges without a slip of one pixel can be found in a natural image by finding masses, each of which consists of pixels of the same specific color, and checking to see whether or not their edges are aligned horizontally and/or vertically. Thus, artificially made letters and the like can easily be extracted. Specific colors may be designated in advance or if there are two or more successive pixels of the same color, the color may be treated as a specific color.

As described above, the present invention is to extract and exclude an artificial image or images, which are contained in a natural image, from the natural image and process the natural image based on the natural image alone. The typical image processing of the present invention is that the tendencies of gradation of a natural image are grasped and revised by revising the gradients of each pixel.

As the gradient of each of the color components of each pixel is prescribed, the tendency of gradation of each color component can be grasped. In addition, the components of brightness can be grasped from all the color components. Thus, the tendencies of gradation of various matters can be grasped. If the tendency of gradation of a matter is grasped, it can be determined whether the tendency of gradation is in accord with a predetermined desirable tendency of gradation or not. Thus, it can be determined whether the tendency of gradation should be revised or not.

On the other hand, an artificial image is formed by pixels of specific colors alone or a mass of pixels of a single color. Thus, the tendencies of gradation of an artificial image differ from those of a natural image. Therefore, if the tendencies of gradation of a natural image containing an artificial image are grasped, the tendencies of gradation of the natural image cannot be revised appropriately. However, the present invention enables the extraction and exclusion of the artificial image or images from the natural image if an artificial image or images are contained in a natural image, the correct grasp of the tendencies of gradation of the natural image, and the determination of whether to revise the tendencies of gradation of the natural image or not.

When the gradients of pixels of a natural image are revised, the tendencies of color components of the natural image change, increasing or decreasing the tinge of, for example, red of the natural image, and the tendencies of components of brightness of the natural image change, increasing or decreasing the brightness of the natural image. Thus, if the tendencies of gradation of a natural image can be grasped, the tinge of red can be increased if it is weak and the brightness can be increased if the natural image is dark. Thus, the natural image can be revised so that its tendencies of gradation will be in accord with desirable tendencies of gradation. However, if the tendencies of gradation of a natural image containing an artificial image are grasped, it cannot be determined appropriately to what degree the tendencies of gradation of the natural image should be revised.

However, the present invention enables the extraction and exclusion of the artificial image or images from the natural image if an artificial image or images are contained in a natural image, the appropriate grasp of how far the tendencies of gradation of the natural image are out of accord with desirable tendencies of gradation, and appropriate revision of the tendencies of gradation of the natural image. Various tendencies of gradation including those of components of color and components of brightness can be adopted.

A preferred example of the image processing is backlight-revising processing. Backlight-revising processing is to grasp the tendency of brightness of a natural image and increase the brightness of the main part of the natural image if the main part (for example, the main subject in a photograph) of the natural image is dark. If the tendency of brightness of a natural image containing an artificial image is grasped, the tendency of brightness of the main part of the natural image cannot be grasped appropriately. Accordingly, it cannot be determined appropriately whether the natural image should undergo brightness-revising processing or not. It cannot be determined how far the brightness of the natural image should be revised, either.

However, the present invention enables the exclusion of the artificial image or images from the natural image if an artificial image or images are contained in a natural image, appropriate determination of whether the natural image should undergo backlight-revising processing or not, and appropriate determination of the degree of the revision if the natural image needs backlight-revising processing. Thus, the present invention enables appropriate backlight-revising processing. Needless to say, the present invention may be applied to other kinds of processing than backlight-revising processing, because it enables the extraction and exclusion of the artificial image or images from the natural image if an artificial image or images are contained in a natural image and the appropriate grasp of the tendencies of gradation of the natural image. One of said other kinds of processing is to widen the distribution of gradation of the natural image to change the contrast of the natural image if the distribution of gradation of a natural image concentrates on the center of the gradient scale.

Before a natural image undergoes backlight-revising processing, it is usually determined whether the main subject in the natural image is backlighted or not. It can be determined by using various kinds of algorithm. If a natural image has a dark area which is surrounded by a bright zone, the dark area is usually regarded as backlighted. In most cases, however, an artificial image consists of pixels of the same brightness. Accordingly, if an artificial image is contained in a natural image, it cannot be determined correctly whether the natural image is of backlight or not. If an artificial image is contained in a natural image of backlight, the natural image maybe regarded as of normal light. If an artificial image is contained in a natural image of normal light, the natural image maybe regarded as of backlight. If an artificial image is contained in a natural image, the degree of backlight-revising processing may not be grasped correctly.

Accordingly, the present invention can be applied to a scheme that it is determined beforehand by a backlight-image-checkup means whether a natural image taken by an image-data-acquisition means is backlighted or not. Specifically, with the above artificial-image-extracting means and image-processing means, image processing can be done to the natural image excluding the artificial image of images after a natural image containing an artificial image or images has been wrongly determined to be of backlight.

Thus, even if the backlight-image-checkup means misjudges some natural images, it can be determined again by the following image processing whether they are of backlight or not. If backlight-revising processing is to be made to a natural image of normal light, doing backlight-revising processing of an appropriate degree to the natural image is equivalent to doing no backlight-revising processing to the natural image. Thus, natural images of normal light can be free of being affected by misjudgment by the backlight-image-checkup means. Namely, by combining the backlight-image-checkup means and the present invention, misjudgment by the backlight-image-checkup means can be made up for. Of course, a natural image containing an artificial image or images may first undergo the artificial-image-extracting processing according to the present invention, then undergo the checkup of backlight, and further undergo the revision of backlight if it is of backlight.

The present invention is to exclude the artificial image or images from a natural image containing an artificial, or non-natural, image or images to process the natural image appropriately. Thus, the subjects of the image processing according to the present invention are natural images. Accordingly, a scheme maybe adopted that a means for determining the kinds of images is first applied to an image and if it is determined to be natural, the above artificial-image-extracting means and image-processing means may be applied to the natural image. With this scheme, the present invention can be applied to only natural images which artificial images are excluded from and need to undergo image processing. Thus, unnecessary processing to images consisting of letters and charts, which do no need the application of the present invention, can be avoided.

As described above, it serves the purpose if artificial images can be extracted in the present invention; accordingly, the artificial-image-extracting means can be embodied in various ways so long as it is capable of extracting artificial images. For example, it may be embodied so that it can calculate the quantity of a characteristic of the image from the image data of an image acquired by an image-data-acquiring means and determine whether the calculated quantity of the characteristic is close to a predetermined reference quantity of the characteristic or not. With this embodiment, it can be adjusted that the image should be determined to be artificial if how close the calculated quantity of a characteristic of an image is to the reference quantity of the characteristic. Thus, the accuracy of determination can easily be adjusted.

The quantities of various characteristics can be adopted. For example, if a part consisting of a plurality of successive pixels of one of the predetermined specific colors is to be extracted as described above, the quantity of such a characteristic can be adopted as the larger the number of pixels of other colors than the specific color in the successive pixels is, the larger the gap between the reference quantity of the characteristic and the calculated quantity of the characteristic is and the larger the gap between the gradients of pixels of other colors than the specific color and the gradients of the specific color is, the larger the gap between the reference quantity of the characteristic and the calculated quantity of the characteristic is. If a part consisting of a plurality of successive pixels of the same color is to be extracted, the quantity of such a characteristic can be chosen as the larger the number of pixels of other colors than a color accounting for the majority of the pixels is and the larger the gap between the gradients of pixels of other colors than the color accounting for the majority of the pixels and the gradient of the color accounting for the majority of the pixels is, the larger the gap between the reference quantity of the characteristic and the calculated quantity of the characteristic is.

It is also possible to estimate by the quantity of a characteristic if two or more parts, each consisting of a plurality of successive pixels of a specific color, are to be found and extracted as artificial images if the edges of the parts are aligned horizontally and/or vertically. For example, the quantity of a characteristic can be adopted which estranges itself from the reference quantity of the characteristic as the disalignment becomes larger if the edges of such two or more parts are aligned horizontally and/or vertically and there is such a part which is out of alignment.

The technique of excluding the artificial image or images from a natural image containing an artificial image or images and processing the natural image as described above is not limited to the invention of a method, but effective as the invention of a device. Besides, some image-processing apparatus are used by themselves and others are built into other apparatus and used. Accordingly, various embodiments are included in the idea of the present invention. The idea of the present invention may be embodied as hardware or the same may be embodied as software.

When the idea of the present invention is embodied as software for image-processing apparatus, the idea of the present invention exists on media wherein the software is stored and the idea of the present invention is used. Such media may be magnetic media, optical magnetic media, or any new media to be developed in future. Needless to say, the primary and secondary duplicated copies of the software fall into the scope of the present invention.

DETAILED DESCRIPTION OF THE PREFERRED EMBODIMENTS

Figure 1:
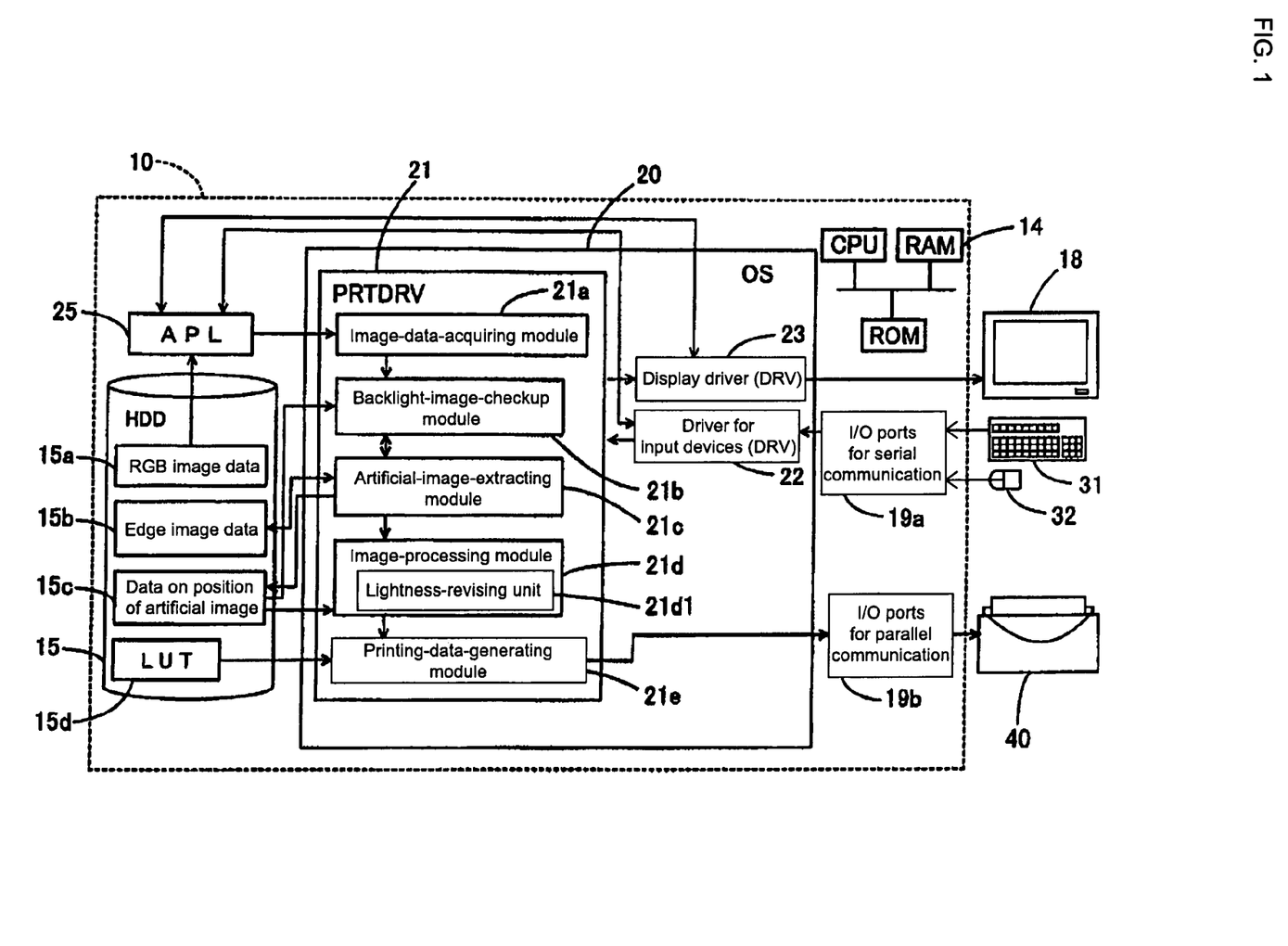
FIG. 1 is a block diagram of an image-processing apparatus in accordance with the present invention.

The embodiments of the present invention will be described in the following order.
(1) Construction of the present invention
(2) Construction of the artificial-image-extracting module
(3) Printing
   (3-1) Extraction of Artificial Image
(4) Other Embodiments
   (1) Construction of the Present Invention FIG. 1 is a block diagram of a computer 10 which is an image-processing apparatus in accordance with the present invention. The computer 10 has a CPU, a ROM, and a RAM and runs a prescribed program by using peripherals such as an HDD 15. Input devices for operation such as a keyboard 31 and a mouse 32 are connected to the computer 10 through I/O ports for serial communication 19a. A display 18 is also connected to the computer 10 through a video board (not shown). A printer 40 is also connected to the computer 10 through an I/O port for parallel communication 19b.

The construction of the computer 10 shown in FIG. 1 is simplified and a personal computer of ordinary construction can be adopted as the computer 10. Of course, the computer which the present invention is applied to is not limited to a personal computer. The computer 10 is a desktop, but it maybe a notebook computer or a mobile computer. The interface between the computer 10 and the printer 40 is not limited to the I/O port for parallel communication 19b, but may be a serial interface, SCSI, USB interface, wireless interface, or new interface to be developed in future.

Although the computer 10 is the image-processing apparatus in this embodiment, the printer 40 may be provided with an environment for running an image-processing program, acquire image data from a digital camera directly connected to it, and process the images represented by the image data. Of course, such a digital camera may process such images in the similar construction, or the image processing of the present invention may be carried out by distributed processing. Thus, various types of construction can be adopted. Moreover, the image processing of the present invention may be carried out by a compound device with the functions of a scanner and a printer.

As shown in FIG. 1, a printer driver (PRTDRV) 21, drivers for input devices (DRV) 22, and a display driver (DRV) 23 are built in the OS 20 of the computer 10. The display driver (DRV) 23 controls the display of images, etc. on the display 18. The drivers for input devices (DRV) 22 receive signals from the keyboard 31 and the mouse 32 through the I/O ports for serial communication 19a.

The reference numeral 25 is an application program (APL) for retouch of color images, etc. While the application program (APL) 25 is running, the user uses the keyboard 31 and the mouse 32 to print images out of the printer 40. In accordance with the user's instructions, the application program (APL) 25 reads RGB image data 15a from the HDD 15 into the RAM 14 and causes the display 18 through the display driver (DRV) 23 to display an image based on the RGB image data 15a. When the user operates the keyboard 31 and the mouse 32, the contents of his operation are acquired through the drivers for input devices (DRV) 22 and interpreted and the application program (APL) 25 makes various kinds of processing such as printing and retouching in accordance with the contents of his operation.

The RGB image data 15a are data in the form of a dot matrix expressing RGB color components in 256 gradients and capable of expressing about 16,700,000 colors. Of course, the present invention can be applied to various kinds of data such as data according to the JPEG standards, data according to Exif 2.2 standards (Exif is a registered trademark of Japan Electronics and Information Technology Industries Association), and data compatible with Print Image Matching (PIM is a registered trademark of Seiko Epson Corporation), too.

The application program (APL) 25 issues instructions for printing. Then, the printer driver (PRTDRV) 21 is driven, sends data to the display driver (DRV) 23, and displays a UI (not shown) to have the user input information necessary for printing such as page numbers. Once the user inputs the information through the UI with the keyboard 31 and the mouse 32, modules of the printer driver (PRTDRV) 21 are started and process the RGB image data 15a to generate data for printing. The data for printing are outputted to the printer 40 through the I/O port for parallel communication 19b and the printer 40 prints an image based on the data for printing.

More specifically, the printer driver (PRTDRV) 21 has an image-data-acquiring module 21a, a backlight-image-checkup module 21b, an artificial-image-extracting module 21c, an image-processing module 21d, and a printing-data-generating module 21e to print images. The image-data-acquiring module 21a acquires pixel data from the RGB image data 15a and sends the pixel data to the backlight-image-checkup module 21b and the artificial-image-extracting module 21c. The backlight-image-checkup module 21b determines based on the brightness of the natural image represented by the RGB image data 15a whether the natural image is of backlight or not.

In this embodiment, it can be determined whether the natural image represented by the RGB image data 15a sent from the image-data-acquiring module 21a is of backlight or not. It is also possible to determine whether the natural image represented by the RGB image data 15a, from which the artificial image or images are excluded by referring to data 15c on the position or positions of an artificial image or images in the natural image, is of backlight or not. The artificial-image-extracting module 21c refers to the RGB image data 15a sent from the image-data-acquiring module 21a and extracts the artificial image or images from the natural image. Then, the artificial-image-extracting module 21c prepares data 15c on the position or positions of the artificial image or images and stores the data 15c in the HDD 15.

The image-processing module 21d revises the gradients of RGB of pixels in the form of a dot matrix and makes other kinds of image processing. The image-processing module 21d has a lightness-revising unit 21d1. The lightness-revising unit 21d1 corrects backlight by referring to the data 15c on the position or positions of the artificial image or images, excluding the artificial image or images extracted by the artificial-image-extracting module 21c from the natural image represented by the RGB image data 15a, and revising the lightness of the natural image. Although details are omitted in this specification, other kinds of image processing may be made before and after the correction of backlight. In this case, it will do if the image-processing module 21d is provided with the functions to do such other kinds of image processing.

The printing-data-generating module 21e transforms the image data after the processing by the image-processing module 21d into data which can be printed by the printer 40.

The printing-data-generating module 21e refers to a LUT 15d to convert the RGB data of pixels into CMYK data or the like (color-converting processing), converts the gradients of pixels into recording densities of ink drops (half-tone processing), arranges pixel data in the order of use (rasterizing), and does other kinds of processing. In this embodiment, the printer driver (PRTDRV) 21 has the artificial-image-extracting module 21c and image-processing module 21d, and the artificial-image-extracting module 21c extracts and excludes the artificial image or images from an natural image containing an artificial image or images and then the natural image is processed. The artificial-image-extracting module 21c will be described in detail below.

(2) Construction of the Artificial-image-extracting Module

Figure 2:
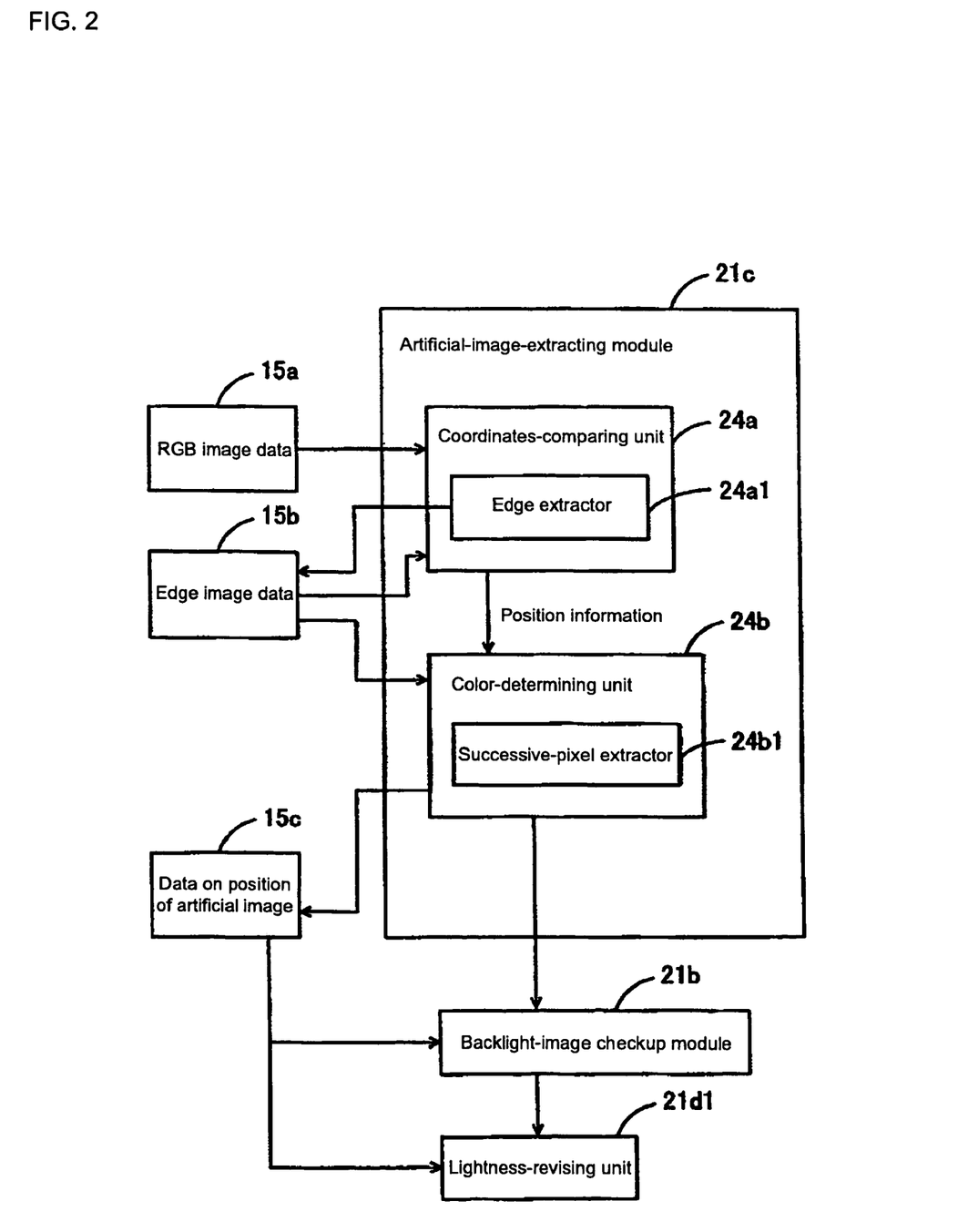
FIG. 2 is a block diagram of an artificial-image-extracting module of FIG. 1.
Figure 3:
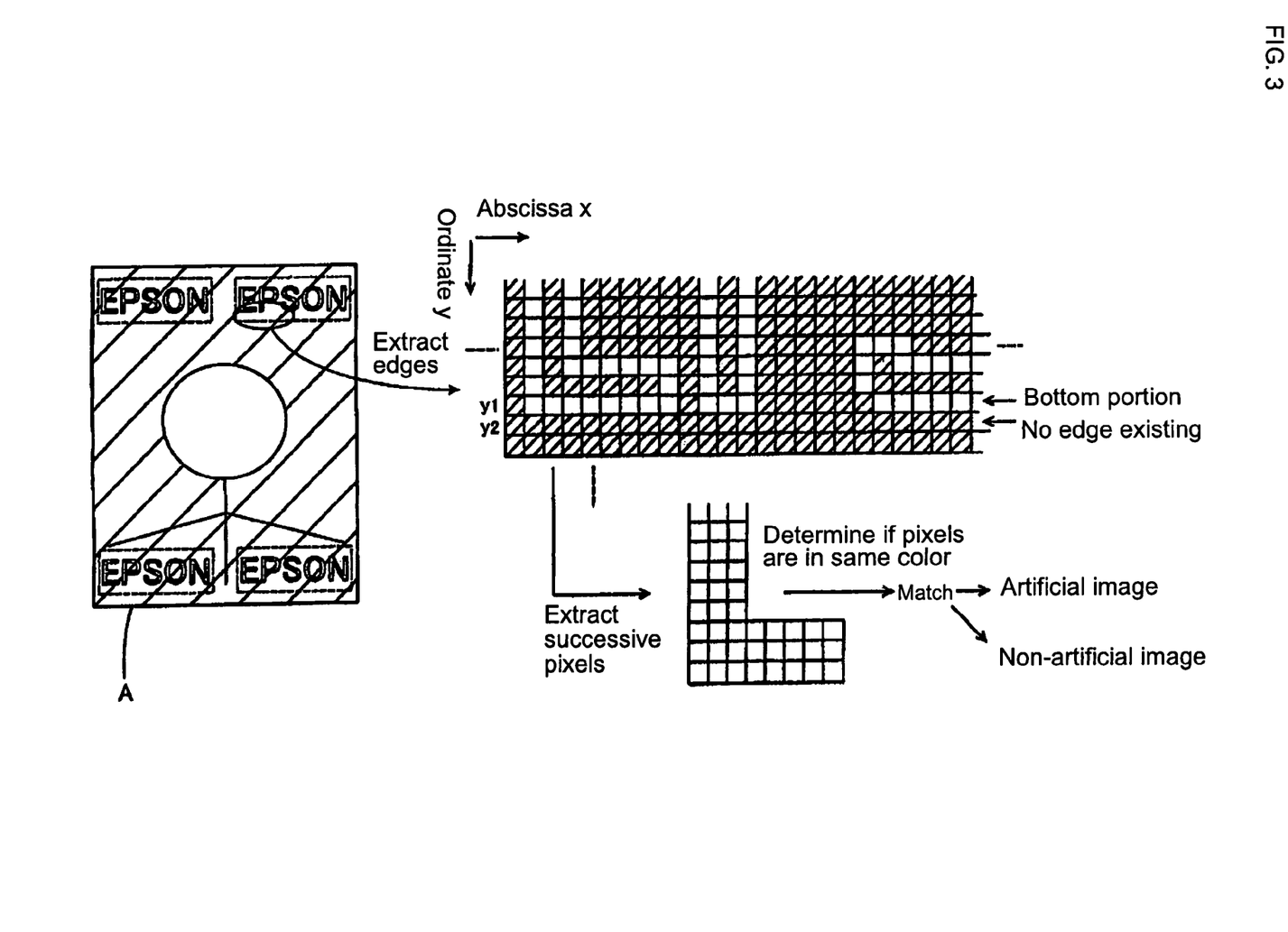
FIG. 3 is an illustration of the processing of the artificial-image-extracting module of FIG. 2.

FIG. 2 is a block diagram of the artificial-image-extracting module 21c. FIG. 3 is an illustration of the processing by the artificial-image-extracting module 21c. An example "A" of images formed by RGB data is shown in the left side in FIG. 3. There is a person in the center of the image "A" and logos in white letters are disposed in the four corners indicated by broken lines. The artificial-image-extracting module 21c has a coordinates-comparing unit 24a and color-determining unit 24b. The coordinates-comparing unit 24a receives the RGB image data 15a of a natural image which was determined to be of backlight.

The coordinates-comparing unit 24a extracts an area which appears uniform to human eyes and extracts horizontal and vertical parts of the edge of the area. For this purpose, the coordinates-comparing unit 24a has an edge extractor 24a1. The edge extractor 24a1 does edge-extracting processing to the RGB image data 15a. Edge-extracting processing means to calculate brightness of pixels from the RGB image data 15a and extract an area where the change of brightness is great. With this processing, artificial images such as letters, lines, patterns, etc. can be extracted from natural images.

The edge extractor 24a1 is a module to apply a so-called edge-extracting filter to the gradients of pixels. With the application of this filter, image data 15b of edges of areas, where the change of brightness is great, are prepared, pixels on the edges treated as "1", the other pixels treated as "0". The edge extractor 24a 1 stores the edge image data 15b in the HDD 15. The enlarged view of a part (a bottom portion of a logo) of the edge image data 15b is shown in the upper right area in FIG. 3. Edge pixels of "1" are shown in white and non-edge pixels of "0" are indicated by hatching.

The coordinates-comparing unit 24a refers to the edge image data 15b and compares the ordinates or abscissas of the edge pixels. The probability for the ordinates of top or bottom edges of areas to coincide with one another is almost nil unless the areas are artificial images. The probability for the abscissas of right or left edges of areas to coincide with one another is almost nil unless the areas are artificial images. The probability for the ordinates of successive top or bottom edge pixels of an area to coincide with one another is almost nil unless the area is an artificial image. The probability for the abscissas of successive right or left edge pixels of an area to coincide with one another is almost nil unless the area is an artificial image.

Thus, the coordinates-comparing unit 24a regards the areas as prospective artificial images if the ordinates of top or bottom edges of areas coincide with one another or the abscissas of right or left edges of areas coincide with one another. The coordinates-comparing unit 24a regards the area as a prospective artificial image if the ordinates of successive top or bottom edge pixels of an area coincide with one another or the abscissas of successive right or left edge pixels of an area coincide with one another.

In the enlarged view in the upper right area in FIG. 3, there are the bottom edges of three areas at the ordinate "y1", whereas there is no edge pixels at the ordinate "y2". Each of the three areas has successive bottom edge pixels at the ordinate "y1", whereas there is no edge pixel at the ordinate "y2". Therefore, these areas are regarded as prospective artificial images. With this processing, a plurality of areas as indicated by broken lines in the left side in FIG. 3 are regarded as prospective artificial images.

In this embodiment, the above prospective artificial images undergo the processing by the color-determining unit 24b, which is a module to determine whether the pixels of each of the prospective artificial images are in one and the same color or not. The color-determining unit 24b has a successive-pixel extractor 24b1. When the color-determining unit 24b receives information about the positions of the prospective artificial images from the coordinates-comparing unit 24a, the successive-pixel extractor 24b1 refers to the edge image data 15b and extracts the prospective artificial areas.

The enlarged view in the lower right area in FIG. 3 shows the areas extracted in this way. The pixels in each of these areas appear uniform to human eyes. If there exist a letter in one of these areas, pixels forming the letter should be contained in the area. On the other hand, if the prospective artificial images are not artificial, the probability for a plurality of successive pixels in each of the prospective artificial images to be in one and the same color is almost nil. Therefore, the color-determining unit 24b extracts the RGB data of the pixels of the prospective artificial images from the RGB image data 15a, compares the gradients of the pixels, and determines whether the pixels in each prospective artificial image are in one and the same color or not.

If the pixels in each prospective artificial image are determined to be in one and the same color, said image is determined to be artificial. If the pixels in each prospective artificial image are determined to be in different colors, said image is determined to be natural. Data 15c on the positions of artificial images are stored in the HDD 15. By preparing the data 15c on the positions of artificial images, the artificial images are extracted from the RGB image data 15a.

In this embodiment, the above artificial images are excluded from the natural image and it is determined whether the natural image is of backlight or not. If the natural image is of backlight, the image-processing module 21d makes the revision of lightness to improve a backlighted object or objects in the natural image. Specifically, the backlight-image-checkup module 21b refers to the data 15c on the positions of artificial images to grasp the positions of artificial images, excludes the RGB data of artificial images from the RGB image data 15a, and determines whether the natural image is of backlight or not. If the natural image is determined to be of backlight, the lightness-revising unit 21d1 revises the lightness of the natural image.

The lightness-revising unit 21d1 raises the brightness of a dark area or areas in the natural image so that the dark area or areas appear to be in normal light. Various well-known kinds of algorithm can be used for the revision of lightness. For example, γ revision or the like can be adopted. It is also possible to calculate the parameter γ by using the mean value of brightness of an ideal image of normal light and the mean value of brightness of the RGB image data 15a of the natural image and revise the lightness of the natural image toward the distribution of brightness of the ideal image of normal light.

(3) Printing

Figure 4:
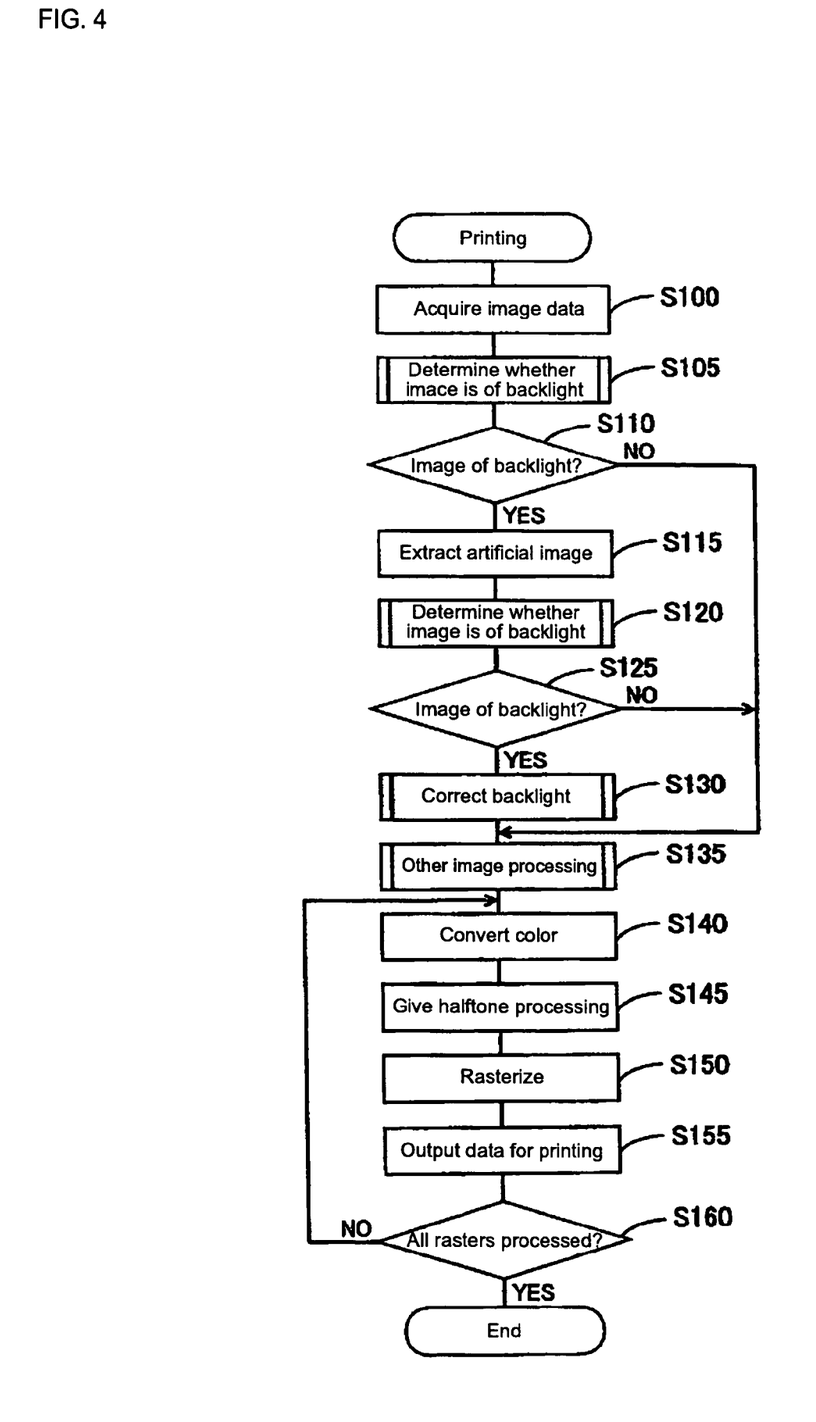
FIG. 4 is a flowchart of the processing of the printer driver (PRTDRV) of FIG. 1.

When the natural image represented by the RGB image data 15a is printed with the application program (APL) 25, the printer driver (PRTDRV) 21 makes the processing shown in FIG. 4. When the application program (APL) 25 issues instructions to print the natural image represented by the RGB image data 15a and parameters are inputted through a UI (not shown), the image-data-acquiring module 21a of the printer driver (PRTDRV) 21 acquires the RGB data of pixels of the natural image from the RGB image data 15a in Step S100.

Figure 5:
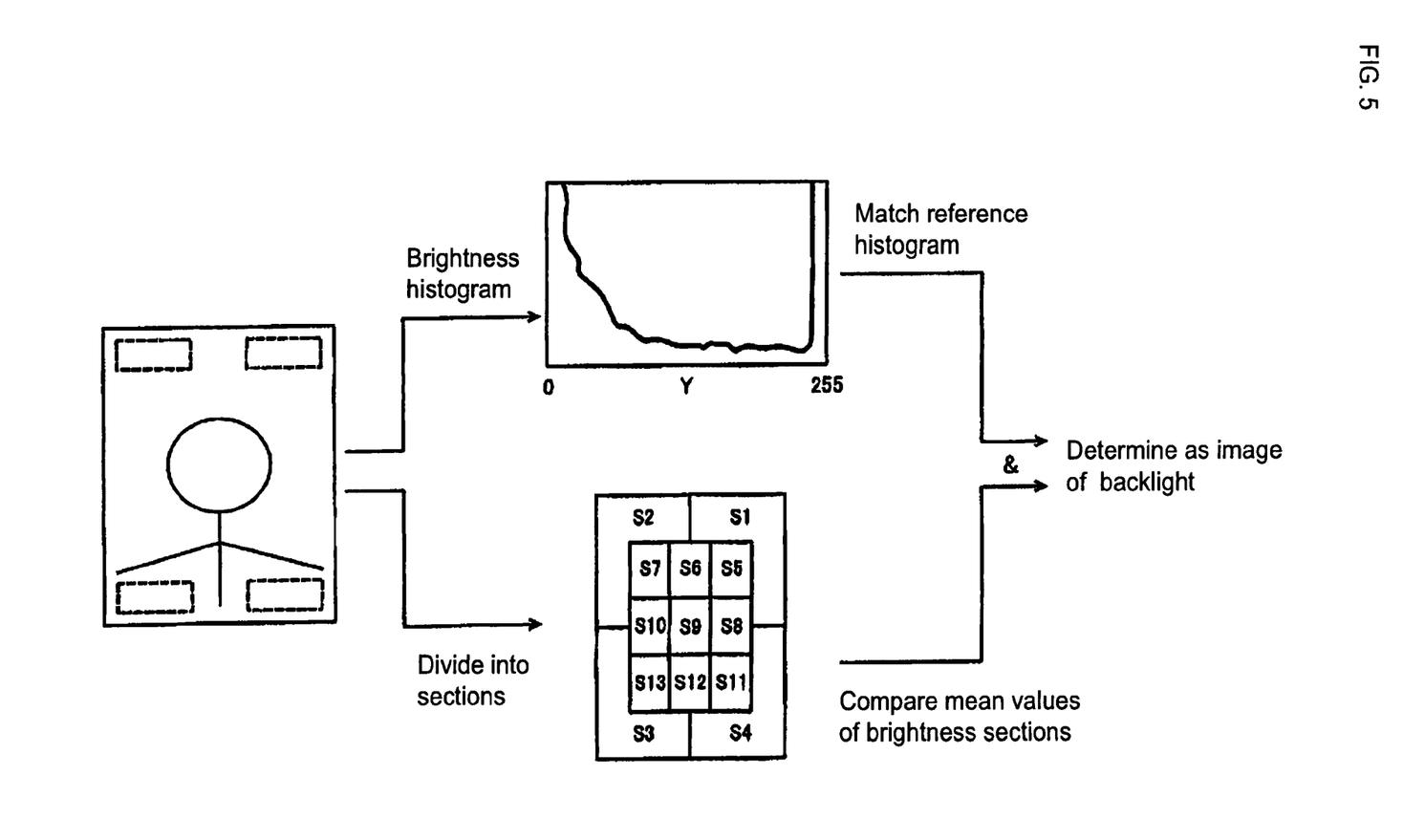
FIG. 5 is an illustration of an example of processing to determine whether natural images are of backlight or not in accordance with the present invention.

Then, the backlight-image-checkup module 21b determines whether the natural image is of backlight or not in Step S105. For this processing, various kinds of algorithm can be adopted. An example of this processing is shown in FIG. 5. A natural image of backlight usually has the main subject in its center and a lighter zone around the main subject as shown in FIG. 5.

Because the RGB image data 15a prescribes the RGB components of each pixel, the components of brightness of each pixel can be calculated from the RGB components of said pixel (for example, brightness Y=0.30R+0.59G+0.11B) and a histogram can be prepared as shown in FIG. 5. It is usual that the main subject in a natural image of backlight is dark and a zone around the main subject is bright; accordingly, the frequency of appearance of high brightness is high and the frequency of appearance of low brightness is relatively high in the histogram of the natural image of backlight. Accordingly, a typical histogram of a typical natural image of backlight is prepared in advance and the histogram of the natural image represented by the RGB image data 15a are compared. If the two histograms are similar to each other, the natural image represented by the RGB image data 15a is regarded as a prospective image of backlight.

The peripheral zone and the central area of the prospective image of backlight are divided into sections S1 to S4 and sections S5 to S13, respectively, and the mean value of brightness of each section is calculated. If the mean values of brightness of the central area are lower than the mean values of brightness of the peripheral zone, the prospective image of backlight is determined to be of backlight. As described above, various kinds of algorithm can be adopted for the identification of images of backlight. On the other hand, if a natural normal-light image with bright letters in its peripheral zone is checked by the algorithm of FIG. 5, the image may be determined to be of backlight.

As described above, if a natural image containing an artificial image or images undergoes various examinations without excluding the artificial image or images from the natural image, the examinations may bring about wrong results. Accordingly, wrong judgments due to artificial images are prevented in the present invention by the process in Step S110. In this embodiment, there are Step S115 (extraction of artificial images) and Step S120 (checkup for images of backlight) in addition to Step S105 (checkup for images of backlight) to prevent wrong judgments about backlight as shown in FIG. 5.

More specifically, if the natural image represented by the RGB image data 15a is regarded as of backlight in Step S105, the artificial images contained in the natural image are extracted and excluded from the natural image in Step S115. During the extraction of artificial images, data 15c on the positions of artificial images are prepared as described in detail later. If the natural image is regarded as of normal light, the processing jumps from Step S115 to Step S135 as shown in FIG. 5.

The backlight-image-checkup module 21b excludes the RGB data of artificial images from the RGB image data 15a based on the data 15c on the positions of artificial images and determines whether the natural image is of backlight or not in Step S120. If the natural image is determined to be of backlight according to the process in Step S125, it undergoes backlight-revising processing in Step S130. If the natural image is determined to be of normal light, the processing jumps to Step S135.

The lightness-revising unit 21d1 makes the backlight-revising processing in Step S130. With this processing, the dark main subject in the natural image is given appropriate lightness and the natural image appears to be of normal light. In Step S135, other kinds of image processing are made. For example, color-balance adjustment, white-balance adjustment, and revision of contrast are made. These other kinds of image processing may be made before Step S105.

Then, the printing-data-generating module 21e is started to make color-converting processing in Step S140. The LUT 15d stored in the HDD 15 is a table to match RGB data with CMYK data. Thus, the RGB data after the above image processing are converted into CMYK data for printing. In Step S145, the color of each pixel by CMYK gradients is converted into recording densities of CMYK ink drops and head-driving data are generated to attach ink to a printing medium at the recording densities.

In Step S150, rasterizing is made to arrange the head-driving data in the order of use by the printer 40. In Step S155, certain information such as resolution is added to the data after the rasterizing to produce data for printing, which is outputted through the I/O port for parallel communication 19b to the printer 40. Then, in Step S160, it is determined whether all the rasters constituting the image after the above image processing underwent the processes from Step S140 to S155. The processes in and after step S140 are repeated until it is determined that all the rasters have undergone the processing. As a result, the printer 40 prints the image after the above image processing according to the above printing data. Namely, even if an original image is of backlight, the printer 40 prints the image which is corrected so that effects of the artificial images are eliminated and the brightness of the main part of the image is increased.

(3-1) Extraction of Artificial Image

Figure 6:
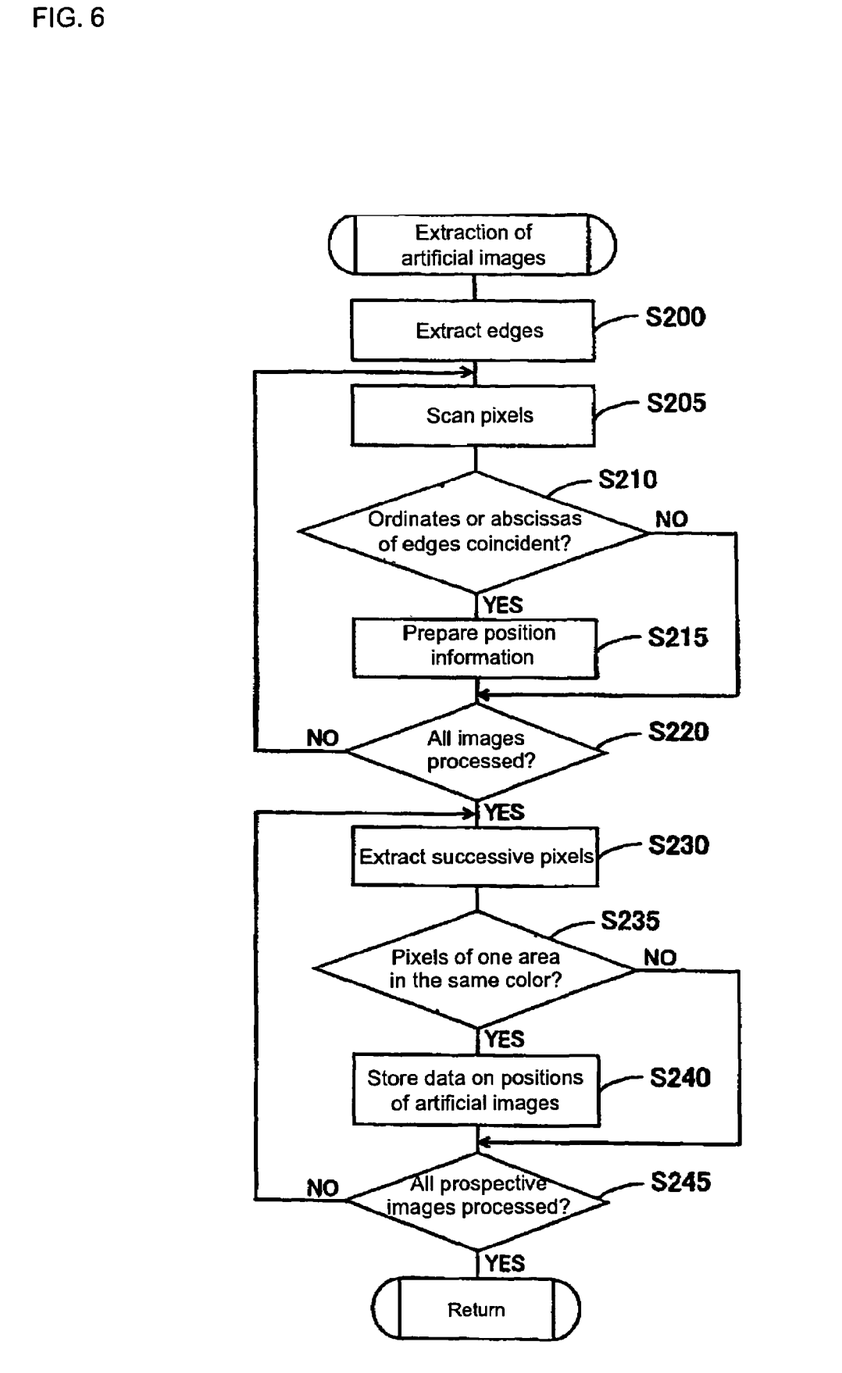
FIG. 6 is a flowchart of the processing to extract artificial images in accordance with the present invention.

Now, a series of processing of the artificial image extraction in Step S115 will be described according to the flowchart of FIG. 6. When extraction of an artificial image is started, the coordinates-comparing unit 24a receives the above-described RGB image data 15a and, in step S200, the edge extractor 24a1 applies the edge-extracting filter to the RGB image data 15a. With the application of this filter, image data 15b of edges of areas are prepared, pixels on the edges treated as "1", the other pixels treated as "0".

The coordinates-comparing unit 24a refers to the edge image data 15b in step S205 and scans edge pixels of "1" on the same ordinates or abscissas. Then, a border of an area surrounded by the edges is found by detecting a part in which there exist a plurality of pixels detected as edges successively in one direction of coordinates and there exists none successively in the other direction. For example, in the view in the upper right area in FIG. 3, there is a plurality of edge pixels detected at the ordinate "y1", whereas there is no edge pixel detected at the ordinate "y2".

Further, there are successive edge pixels in the direction in which the value of the ordinate "y" reduces (in the direction of an upper part of FIG. 3). However, there exists none successively in the direction in which the value of the ordinate "y" increases (in the direction of a lower part of FIG. 3). When these circumstances are grasped, it is found that there is a mass of edge pixels above the ordinate "y1" and there exists an area surrounded by the edge pixels. Thus, the area surrounded by the edge pixels is detected by giving the above processing vertically and horizontally to the pixels scanned for grasping the direction in which the edges exist successively. There are, of course, various methods for scanning edge pixels. For example, a line of rasters of the RGB image data 15a may be scanned as a whole. Alternatively, a certain number of pixels as a unit (for example, an area indicated by broken lines in the left part of FIG. 3) may be scanned.

Thus, when the area surrounded by the edge pixels is detected, it is found that the edge pixels existing at the end portion thereof form the border of the area. Accordingly, in Step S210, the coordinates-comparing unit 24a compares the ordinates or a abscissas of the edge pixels to see if they are coincident and determines if an area surrounded by them can be prospective artificial images. To be more specific, the coordinates-comparing unit 24a regards the area as a prospective artificial image if the ordinates of top or bottom edges of areas coincide with one another or the abscissas of right or left edges of areas coincide with one another. Also, the coordinates-comparing unit 24a regards the area as a prospective artificial image if there are numbers of pixels in which the ordinates of successive top or bottom edge pixels of areas coincide with one another or the abscissas of successive right or left edges of areas coincide with one another. Further, in the former case, an artificial image such as letters in which a plurality of areas exist successively at certain pixel intervals is assumed. Also, in the latter case, an artificial image such as lines in which a plurality of areas do not exist successively but numbers of pixels exist successively in one area is assumed.

In Step S210, when prospective artificial images are extracted by determining whether or not the ordinates or abscissas of edges are coincident, in Step S215, information on positions of the prospective artificial images is prepared and is given to the color-determining unit 24b. When no prospective artificial image is extracted in Step S210, the processing jumps to Step 220. In Step S220, it is determined whether or not all the acquired RGB image data 15a underwent the above extraction of prospective artificial images. The processes in and after Step S205 are repeated until it is determined that all the data have undergone the above extraction of prospective artificial images.

When prospective artificial images are extracted as described above, in and after Step S230, the color-determining unit 24b determines whether the pixels of each of the prospective artificial images are in one and the same color or not to extract the artificial images. For this purpose, the successive-pixel extractor 24b1 of the color-determining unit 24b extracts successive edge pixels in step S230. Namely, a border portion of the above prospective artificial image is extracted according to successive edges, and pixels on and inside the border portion are grasped. Since the border portion and the inside thereof form one area in the image, in Step S235, RGB data of pixels corresponding to those pixels are extracted from the above RGB image data 15a and it is determined whether those pixels are in one and the same color or not.

If the pixels are determined to be in one and the same color in Step S235, the data about the positions of those pixels are stored in the HDD 15 as data 15c on positions of artificial images in Step S240. If the pixels are determined to be in different colors in Step S235, the processing jumps to Step S245. In Step S245, it is determined whether or not all the prospective artificial images underwent the above color determining processing. The processes in and after Step S230 are repeated until it is determined that all the prospective artificial images have undergone the color determining processing. According to the above processing, the artificial images are extracted from the RGB image data 15a and the data 15c on the positions of the artificial images are prepared.

(4) Other Embodiments

Figure 7:
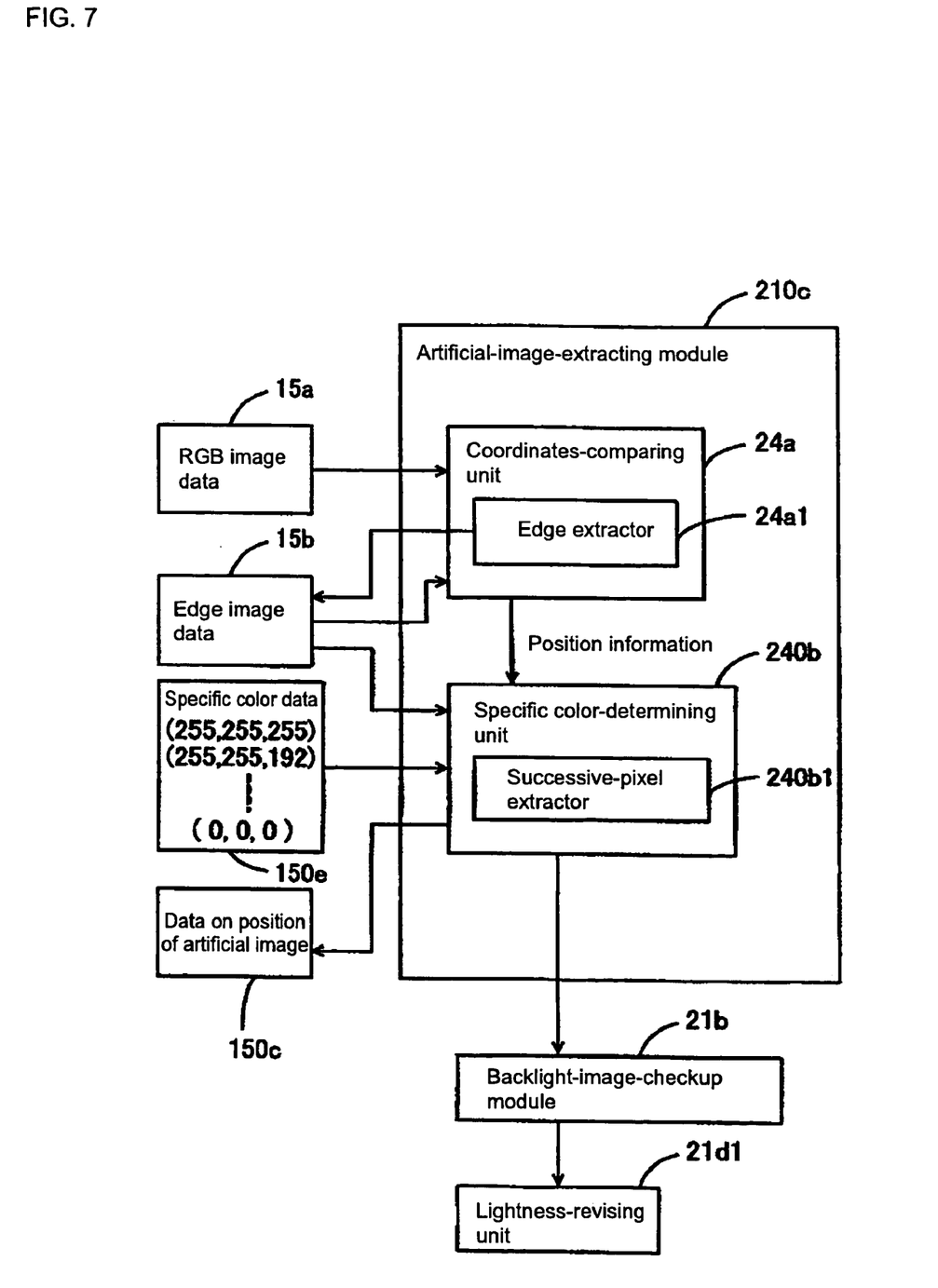
FIG. 7 is a block diagram of another artificial-image-extracting module in accordance with the present invention.

In the first embodiment, artificial images are extracted on the condition that ordinates or abscissas of edges are coincident with one another and that the common area is in one and the same color. In the present invention, however, it serves the purpose if artificial images are extracted from natural images containing the artificial images and image processing is performed by excluding such artificial images. Therefore, various other constructions can also be adopted. FIG. 7 is a block diagram of the artificial-image-extracting module 210c according to the second embodiment.

In the second embodiment, a part of the construction of the artificial-image-extracting module 210c is different from the one in the above first embodiment. Other constructions, namely, the module construction of PRTDRV 21 in FIG. 1 and the construction of the coordinates-comparing unit 24a are the same as those in the first embodiment. The above artificial-image-extracting module 210c has a specific color-determining unit 240b instead of the color-determining unit 24b. The specific color-determining unit 240b determines whether pixels in each of areas appearing uniform to human eyes are in a prescribed specific color or not.

For this purpose, the specific color-determining unit 240b has a successive-pixel extractor 240b 1, which refers to the edge image data 15b and extracts portions therein comprising successive pixels regarded as "1" and an area surrounded by the successive portions. Namely, when the coordinates-comparing unit 24a prepares the edge image data 15b by the same processing as in the first embodiments, extracts prospective artificial images and gives information on the positions of the prospective artificial images to the specific color-determining unit 240b, the successive-pixel extractor 240b 1 extracts the uniform prospective artificial areas.

The specific color-determining unit 240b determines whether the color of the area extracted by the successive-pixel extractor 240b1 is one of the specific colors or not. When the color of the extracted area is one of the specific colors, the area is regarded as an artificial image and data representing its position is stored in the HDD 15 as the data 150c on the position of the artificial image. The specific color described above is specified by specific color data 150e stored in the HDD 15 in advance, and the specific color data 150e are, in other words, gradients of the pixels of RGB color components representing specific colors.

Namely, in the present embodiment, colors frequently used for artificial images are grasped as specific colors in advance. When the pixels of the area surrounded by edges are of this specific color only, the area is regarded as an artificial image. If it is a natural image, even a portion which appears to have one and the same color to human eyes actually has different colors at pixel level (the gradients of the pixels are different). Considering the above, it is almost impossible for a certain area to be of a specific color only. Therefore, if pixels of an area extracted by the successive-pixel extractor 240b1 is of a specific color only, this area can be extracted as an artificial image.

Artificial images such as letters and lines are generally prepared by various application software, and most of such application software have several to scores of default colors to be chosen for those artificial images. Therefore, as to an example of specific colors, a construction using those default colors and the like can be adopted. To be more specific, in RGB color components whose gradients range from 0 to 255, the colors (R, G, B)=(0, 0, 0), (0, 0, 64), . . . (255, 255, 255) expressed by either of the color component values of 0, 64, 128, 192, and 255 can be adopted. The specific color data 150e shown in FIG. 7 is an example of the data of such colors.

Of course, it is possible to adopt other values as specific colors. For example, the values may be varied as 0, 32, 64, 96, 128, 160, 192, 224, 255, and the colors expressed by the combination thereof may be adopted. Alternatively, a color whose color component values are the same (achromatic color) may be used as a specific color. Of course, a user may choose any color as a specific color, and various other constructions can also be adopted.

When the specific color-determining unit 240b prepares data 150c on the positions of artificial images, the backlight-image-checkup module 21b extracts artificial images, excludes the RGB data of the artificial images from the RGB image data 15a based on the data 150c on the positions of artificial images and determines whether the image is of backlight or not again. If the image is determined to be of backlight, it undergoes backlight-revising processing by the lightness-revising unit 21d1. Therefore, even in the case of an image containing artificial images, misjudgment by the backlight-image-checkup means is prevented, and the degree of backlight revising can be grasped correctly.

In the embodiments described above, the judgement by the coordinates-comparing unit 24a and the judgement by the color-determining unit 24b or the specific color-determining unit 240b are combined. Of course, however, these three types of judgement may be all combined or only one judgement may be satisfactory, and any combination thereof can be adopted. Further, in a construction adopting the judgement by the color-determining unit 24b or specific color-determining unit 240b only, it is necessary to extract a uniform area by the edge extractor 24a1, etc.

Since it serves the purpose if the edge extractor can extract an area which appears uniform to human eyes, edges may be estimated not according to the brightness as described above but according to gradients of pixels of each color component. Of course, various constructions can be adopted so long as they can extract an area which appears uniform to human eyes.

Further, in the above embodiments, it is required that the ordinates or abscissas of the edges of areas exactly coincide with one another and the pixels of areas are in one and the same color. However, some allowance may be made for the judgement without demanding such strict conditions. For example, a process can be adopted in which functions are defined such that the more the ordinates or abscissas deviate the greater the value becomes or the more the difference in colors of the area grows the greater the value becomes, and the image is determined as an artificial image when the function value is below a certain threshold value. Of course, it may be so constructed that a prescribed threshold value is set and, when difference between the coordinates or gradients of pixels is below the threshold value, they are regarded as coincident. Thus, when allowance is made for the judgement, precision in extracting artificial images can be controlled. Further, it becomes possible for the present invention to be applied to the format like the one used for an image by JPEG in which two pixels with the same color component values before compression may have more different colors after compression.

Further, in the present embodiment, it serves the purpose so long as an artificial image is extracted during the image processing, and the artificial image may be extracted in various other ways. For example, data on a position where an artificial image is imbedded may be written in a header portion of data according to Exif 2.2 standards or data compatible with Print Image Matching so that the presence of the artificial image and its position are grasped by referring to such data. According to such a construction, the artificial image can be extracted by very simple and high-speed processing.

Further, if an artificial image can be extracted from a natural image, it makes it possible to exclude the artificial image to perform appropriate image processing. Accordingly, the present invention can be applied to various image processing in addition to the backlight-revising processing described above. For example, if the present invention is applied to revision of contrast in which brightness distribution is expanded or narrowed when the value area of brightness of the image is extremely narrow or expanded, the judgement as to whether or not the revision of contrast should be performed or the degree of revising the contrast can be appropriately made. In addition to this, when the present invention is applied to color fogging correction which corrects the gradients of color components when color fogging occurs in which gradients of the color components are distributed over an extremely greater value range or extremely smaller value range, the judgement as to whether or not the color fogging correction should be performed and the degree of correcting color fogging can be appropriately achieved.

Further, in the present embodiment, it serves the purpose if image processing is not inappropriately affected by an artificial image when a natural image contains the artificial image. Therefore, it may be determined in advance whether image data are of the natural image or not. For this purpose, it may be determined, for example, whether the brightness histogram of the image has an expanded portion or not, and determined that it is a natural image when the histogram has a certain expanded portion. Alternatively, data indicating that an image is natural or not may be written in the header of image data to make judgement according to such data. Thus, various kinds of constructions can be adopted. According to such constructions, it is possible to avoid applying the present invention to images of texts, charts and the like to which the present invention doesn't have to be applied.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method comprising:
   an image-data acquiring procedure acquiring image data by which an image is represented with a plurality of pixels;
   an artificial-image extracting procedure extracting a plurality of portions as prospective artificial images, each including a plurality of successive pixels of a specific color, and extracting the prospective artificial images as the portions being image data characterizing the artificial images if ordinates or abscissas of their edges are coincident; and
   an image processing procedure excluding the portion of the artificial image extracted from said acquired image data in the artificial-image extracting procedure and performing prescribed image processing.

2. An image processing method as set forth in claim 1, wherein said artificial-image extracting procedure includes extracting a portion consisting of a plurality of successive pixels of the same color.

3. An image processing method as set forth in claim 1, wherein said image processing procedure grasps tendencies of gradation of the image based on said image data and, when the tendencies of gradation is not in accord with prescribed desirable tendencies of gradation, revises the tendencies of gradation of the image by revising the gradients of each pixel.

4. An image processing method as set forth in claim 1, wherein said image processing procedure includes backlight-revising processing increasing brightness of a darker part of the image.

5. An image processing method as set forth in either of the procedures in claim 1, wherein the image processing method comprises a backlight-image-checkup procedure determining whether the image data acquired in said image data acquiring procedure is of backlight or not by using prescribed algorithm, and said artificial-image extracting procedure and image-processing procedure are given to the image data which are determined to be of backlight in the backlight-image-checkup procedure.

6. An image processing method as set forth in claim 1;

wherein the image processing method comprises a procedure for determining the kinds of images which determines whether an image represented by the image data acquired in said image-data acquiring procedure is a natural image or not, and wherein said artificial-image extracting procedure and image processing procedure are applied to the image data which is determined to be the natural image in said procedure for determining the kinds of images.

7. An image processing method as set forth in claim 1;

wherein said artificial-image extracting procedure calculates the quantity of a characteristic of the artificial image from the acquired image data characterizing the artificial image; and wherein the image represented by the image data is extracted as an artificial image when the calculated quantity of the characteristic is close to the reference quantity of the characteristic stored in a prescribed storage medium in advance.

8. An image processing apparatus acquiring image data by which an image is represented with a plurality of pixels and performing image processing, comprising:

an artificial-image extractor extracting a plurality of portions as prospective artificial images, each including a plurality of successive pixels of a specific color, and extracting the prospective artificial images as the portions being image data characterizing the artificial images if ordinates or abscissas of their edges are coincident; and an image processor excluding the image data of the portion extracted from said acquired image data by the artificial-image extractor and performing prescribed image processing.

9. A computer-readable storage medium encoded with a computer program for acquiring image data by which an image is expressed with a plurality of pixels from a prescribed storage medium and processing the image data, the computer program comprising computer-executable instructions causing a computer to execute the following:

an image-data acquiring procedure acquiring image data by which an image is expressed with a plurality of pixels;

an artificial-image extracting procedure extracting a plurality of portions as prospective artificial images, each including a plurality of successive pixels of a specific color, and extracting the prospective artificial images as the portions being image data characterizing the artificial images if ordinates or abscissas of their edges are coincident; and an image processing procedure excluding the image data of the portion extracted from said acquired image data by the artificial-image extracting function and performing a prescribed image processing.

* * * * *